United States Patent
MacDuff

[11] Patent Number: 6,095,571
[45] Date of Patent: Aug. 1, 2000

[54] TUBING CONNECTOR

[76] Inventor: James MacDuff, 1284 Montrose Avenue, Victoria, British Columbia, Canada, V8T 2K6

[21] Appl. No.: 09/157,491
[22] Filed: Sep. 21, 1998
[51] Int. Cl.⁷ .................................................. F16L 33/207
[52] U.S. Cl. ............................ 285/256; 285/347; 29/516; 29/890.144
[58] Field of Search .................................. 285/256, 259, 285/347, 18; 29/516, 890.144

[56] References Cited

U.S. PATENT DOCUMENTS

| 398,582 | 2/1889 | Cowen | 285/256 |
|---|---|---|---|
| 724,129 | 3/1903 | Schrader | 285/256 |
| 3,112,939 | 12/1963 | Graham . | |
| 4,603,890 | 8/1986 | Huppee . | |
| 5,364,134 | 11/1994 | Anderson | 285/256 X |
| 5,378,023 | 1/1995 | Olbrich | 285/259 X |
| 5,480,196 | 1/1996 | Adams, Jr. . | |

FOREIGN PATENT DOCUMENTS 993010  7/1996  Canada .

Primary Examiner—Dave W. Arola
Attorney, Agent, or Firm—Gerald E. Helget; Rider, Bennett, Egan & Arundel

[57] ABSTRACT

A tubing connector for sealingly engaging an end portion of a tubing to serve as a conduit for pressurized fluids is described. The tubing connector is particularly intended for use with a composite tubing having inner and outer plastic layers with an intermediate aluminium layer. An elastic seal ring is provided in each of two annular spaced apart grooves in an external periphery of a connector portion of the tubing connector. Each of the grooves has a depth that approximates a thickness of the seal ring and a width greater than a width of the seal ring. When the connector portion is inserted in the tubing and a radial pressure is exerted on the tubing by a crimp ring, the plastic inner periphery of the tubing intrudes into each annular groove and further compresses the seal ring inwardly in the groove. The remainder of the tubing overlapped by the crimp ring is compressed tightly around the external periphery of the connector portion. Therefore, a fluid tight seal is achieved. The advantage is a reliable connector for composite tubing that is quickly and easily installed and is adapted to provide a fluid-tight seal even when subjected to high temperature fluids under pressure.

13 Claims, 2 Drawing Sheets

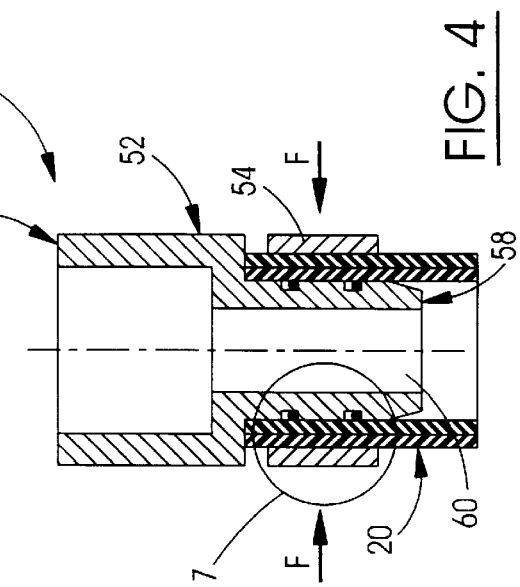
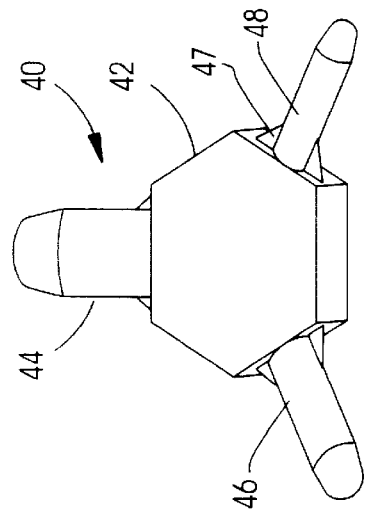
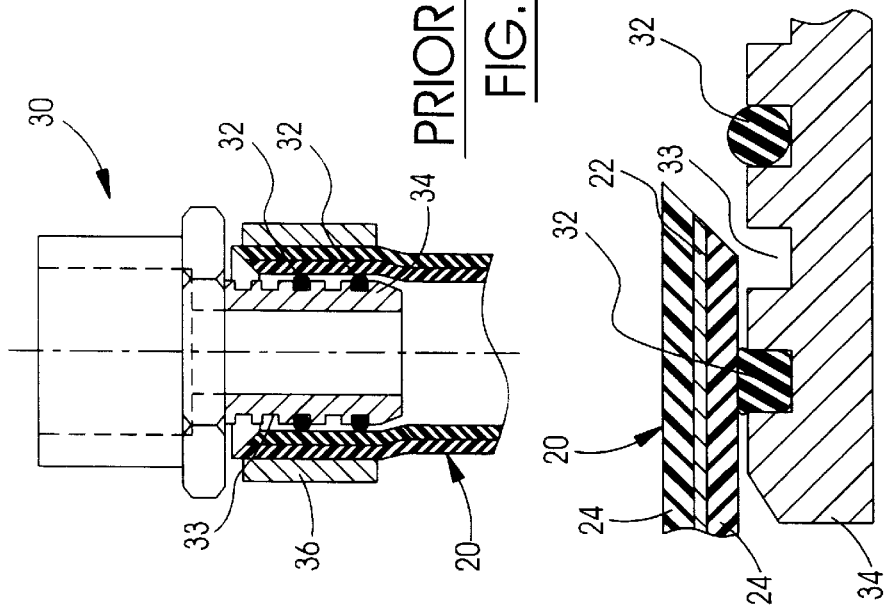

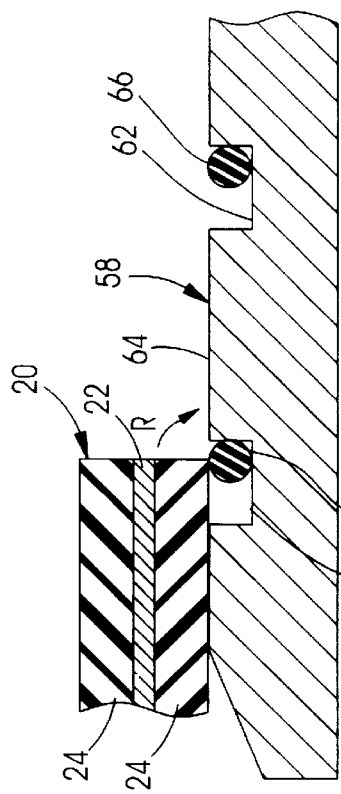
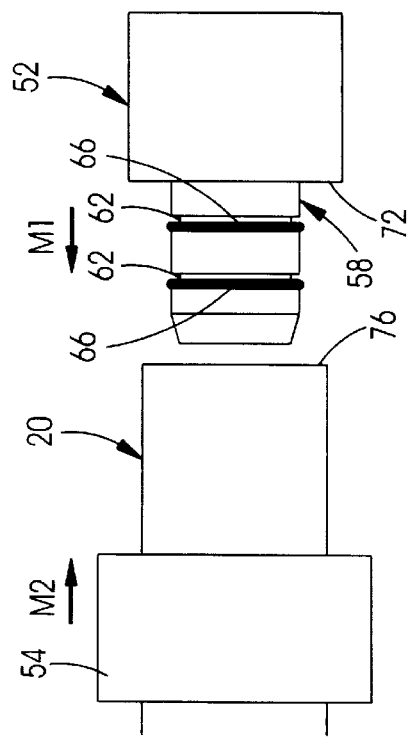
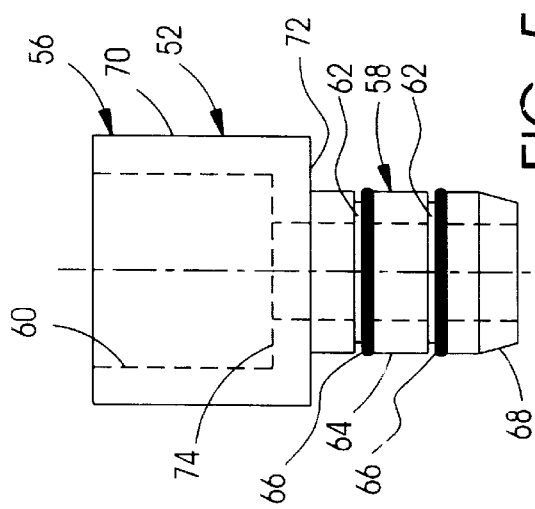
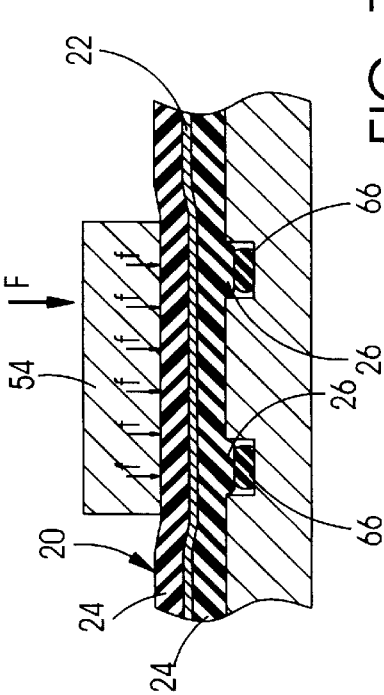

TUBING CONNECTOR

TECHNICAL FIELD

This invention relates to coupling devices and, more particularly, to a tubing connector for expediting fluid tight coupling of tubing used in pressurized fluid systems.

BACKGROUND OF THE INVENTION

In the plumbing industry, multi-purpose composite pressure tubing and the applications for such tubing have been developing rapidly. Composite tubing is a multi-layer tubing which generally consists of an inner layer of plastics material, an intermediate layer of aluminium alloy and an outer layer of a plastics material. Composite tubing provides the advantages of both metal and plastic and is useful in a wide range of applications because of its flexibility and strength, especially its resistance to rupture when subjected to relatively high temperature and pressures. Multi-purpose composite pressure tubing can be used in both indoors and outdoors, cast in concrete, concealed in walls, floors and ceilings or surface mounted. It can be used for hot and cold water distribution, under surface floor heating, ice melt systems for sidewalks and driveways, air-conditioning systems, compressed air and industrial process piping. Composite tubing is available, for example, from IPEX, which produces a tubing (KITEC ®) consisting of an aluminium tubing laminated between two layers of polyethylene. To produce this tubing, an aluminium strip is formed, overlapped and then ultrasonically welded. Layers of polyethylene are then applied with an adhesive to form a bond with the aluminium tubing. The result is a tubing that does not rust, corrode or tuberculate. Fittings are commercially available for use with this composite tubing and an example of those fittings is described below.

In the general prior art, the use of O-rings to provide a seal between an exterior of a pipe and an interior of a connecting pipe is known. Canadian Patent No. 993,010 entitled METER RISER ASSEMBLY, which issued on Jul. 13, 1976 to Mueller Co., for example, discloses a meter riser assembly for use in connecting a fluid meter with a plastic service line. One embodiment shown in FIG. 6 discloses two O-rings adapted to provide a seal between an exterior of a coated metal pipe and an interior of the service line.

U.S. Pat. No. 3,112,939, entitled THREADLESS TUBING CONNECTOR, which issued to Graham on Dec. 3, 1963; U.S. Pat. No. 4,603,890 entitled BARBED TUBING CONNECTOR, issued to Huppee on Aug. 5, 1986; U.S. Pat. No. 5,480,196 entitled DUCTILE IRON PIPE JOINT EMPLOYING A COUPLING AND COUPLING THEREFOR which issued to Adams, Jr. on Jan. 2, 1996 discloses various applications of O-ring seals associated with tubing connectors. Huppee also discloses in his patent a tensioning strip adjustably surrounding the tubing in registry with the O-rings to exert radial pressure on the tubing to compress the O-rings. The tension strip is normally used in association with a tubing that has a high degree of elasticity.

Although each of these prior art patents relate to O-ring seals associated with threadless tubing connectors, they are not adapted to be used with composite tubing to provide fast installation and a dependable fluid tight seal. Therefore, it is desirable to provide a tubing connector which can be easily and quickly installed in a composite tubing and provides a dependable fluid tight seal even in a high pressure and high temperature application such as an in-floor heating system.

SUMMARY OF THE INVENTION

An object of the invention is to provide a tubing connector which can be rapidly installed in a tubing having a plastic inner periphery to provide a dependable fluid tight fitting.

Another object of the invention is to provide a threadless tubing connector adapted for installation in a composite tubing used as a conduit for pressurized fluids.

A further object of the invention is to provide a method of sealing an interface between a cylindrical metal tubing connector and a tubing having an elastic inner periphery.

The connector end of the tubing connector is preferably tapered to facilitate insertion of the tubing connector into the end of the tubing. Preferably, the connector end also has a second annular groove and a second elastic seal ring received therein, the two annular grooves being spaced apart. The external periphery of the connector end preferably has a diameter slightly less than but approximating the inner diameter of the end of the tubing.

The fitting end of the tubing connector preferably forms a shoulder adapted to limit the insertion of the connector end into the end of the tubing.

The annular clamp is preferably a crimp ring comprising a flat band with a inner diameter slightly greater than an external diameter of the tubing. The crimp ring is made of a rigid deformable material such as a copper alloy. The part of the inner periphery of the tubing under a compressive force of the flat band intrudes into the annular groove and compresses the seal ring inwardly in the annular groove to form a seal after the flat band is crimped.

In accordance with a further aspect of the invention a method of sealing an interface between a cylindrical metal tubing connector and a tubing having a plastic inner periphery comprises:

inserting the cylindrical metal tubing connector into an end of the tubing, the tubing connector having an elastic seal ring in an annular groove around an external periphery of the metal tubing connector, the groove having a width greater than a width of the seal ring and a depth, slightly greater than a thickness of the seal ring; and exerting radial pressure around the tubing in an area that overlaps the seal ring to compress the tubing so that an annular part of the inner periphery of the tubing intrudes into the annular groove and compresses the seal ring in the annular groove to form the seal.

The radial pressure around the tubing is preferably exerted around the tubing by a flat crimp ring installed using a crimping tool. The flat crimp ring is preferred because of its simple configuration and ease of installation, as well as its reliability and durability even in a corrosive environment. The annular groove is designed to have a width that permits axial expansion of the elastic seal ring. The annular groove is also designed to have a depth that is slightly greater than a thickness of the seal ring. This not only reduces the possibility of the seal ring being damaged or rolled out of the groove in the tubing connector, but also, more importantly, permits an annular part of the inner periphery of the tubing compressed by the crimp ring to intrude into the annular groove and compress the seal ring inwardly in the groove. This will ensure a reliable fluid tight seal that will withstand high fluid temperatures and pressures.

BRIEF DESCRIPTION OF THE DRAWINGS

FIG. 1 is an elevational view, partially in cross-section of a prior art tubing connector installed in an end of a composite tubing, with a copper crimp ring for retaining the tubing connector in the tubing;

FIG. 2 is a perspective view of a prior art bevelling tool used to enlarge and bevel an end of the tubing shown in FIG. 1 before the tubing connector is installed;

FIG. 3 is a partial sectional view of the tubing connector assembly shown in FIG. 1, illustrating the seal ring when the connector is fully inserted in the tubing;

FIG. 4 is an elevational view, partially in cross-section, of a preferred embodiment of a tubing connector in accordance with the invention;

FIG. 5 is an elevational view of the tubing connector shown in FIG. 4;

FIG. 6 is a partial cross-sectional view of the tubing connector shown in FIG. 4, showing an action of a seal ring when the tubing connector is inserted into the tubing;

FIG. 7 is a cross-sectional view of an enlarged scale of a circled area, indicated by reference numeral 7 of FIG. 4, illustrating how the connector shown in FIG. 4 which achieves a fluid tight seal; and FIG. 8 illustrates the installation for the tubing connector shown in FIG. 4.

DETAILED DESCRIPTION OF THE PREFERRED EMBODIMENT

FIG. 1 illustrates an example of a prior art fittings manufactured for use with composite tubing. The composite tubing 20 illustrated in FIGS. 1 to 5 and 7 to 9, comprises an aluminium tube 22 laminated between two layers of polyethylene 24. It is flexible and deformable but is less elastic than a plastic tubing of the same diameter, and therefore maintains its shape when bent or deformed. The fitting is brass and has two O-rings 32 received in two annular grooves 33 on a connector end 34. A crimp ring 36 is crimped around the tubing 20 to secure the fitting 30. The crimp ring 36 is a flat copper band and has an inner periphery that is larger than the external periphery of the tubing 20. The crimp ring 36 is moved axially along the tubing 20 away from the end before the insertion of the fitting 30. The connector end 34 of the fitting 30 is larger than an internal diameter of the composite tubing 20. Consequently, in order to insert the fitting 30 into the tubing 20, the end of the tubing must be expanded using a bevelling tool illustrated in FIG. 2. The bevelling tool 40 includes a central body 42 and three tapered bevelling heads 44, 46 and 48 with cutters 47, respectively, having a diameter adapted for a specific diameter of composite tubing. After the tubing 20 is expanded, the end of the tubing is permanently deformed.

FIG. 3 illustrates an O-ring 32 which is compressed to expand axially in the space between the inner periphery of the tubing 20 and the external periphery of the connector end 34 when the O-ring 32 is fully inserted in the tubing 20, the end of which is bevelled by the cutter of the bevelling tool 40. Because of the width and depth of the annular grooves 33, the O-rings 32 are compressed against the sides of a top of the grooves and consequently may be damaged. Such damage sometimes causes undesirable leakage between the tubing 20 and the prior art fitting 30.

FIG. 4 illustrates a preferred embodiment of the invention. A tubing connector assembly 50 comprises a rigid tubular connector 52 and an annular clamp 54, which is preferably a flat crimp ring, through other annular clamps such as a base clamp could also be used for the same purpose. The rigid tubular connector 52, preferably made of brass, has a fitting end 56 and a cylindrical connector end 58. A bore 60 extends from the connector end 58 to the fitting end 56. As shown in FIG. 5, two annular grooves 62 are provided on an external periphery 64 of the connector end 58. The annular grooves 62 are spaced apart from each other. Two elastic seal rings 66 are respectively received in the two annular grooves 62. The elastic seal rings 66 are preferably O-rings. Each of the annular grooves 62 has a depth slightly greater, than a thickness of a seal ring 66 so that an external periphery of the seal ring 66 is slightly below the external periphery 64. Each annular groove 62 has a width greater than a width of the seal ring 66 to provide room for the seal ring 66 to expand axially in the groove 62. The endmost section of the connector end 58 is tapered, as indicated by the reference numeral 68. The tapered section 68 facilitates insertion of the connector end into the tubing 20. The fitting end 56 of the embodiment shown in the drawings is also cylindrical and has a larger diameter than the external periphery 64 of the connector end 58 so that a shoulder 72 is formed at an interface between the external peripheries 64 and an outer surface 70 of the fitting end. The fitting end of the tubing connector 50 may be any type of fitting, such as a male or female adapter, a Tee, a 90° elbow or any other coupling.

The external periphery 64 of the connector end 58 has a diameter slightly less than but approximate an inner diameter of the end of the tubing 20. As illustrated in FIG. 6, the seal ring 66 has a tendency to roll in the annular groove 62 as indicated by the arrow R when the tubing connector is inserted into the tubing 20 if the external periphery of the seal ring 66 protrudes slightly above the external periphery 64. Because the external periphery of the seal ring 66 is slightly below the external periphery of the connector end and the seal ring 66 has room to expand axially in the groove 62, the seal ring 66 does not roll out of the groove 62 and is compressed under the inner periphery of the tubing 20 when the connector end 58 of the tubing connector 52 is inserted into the end of the tubing 20. The extra space in the annular groove 62 provides room not only for axial expansion of the seal ring 66, but also provides room for an intrusion of the inner periphery of the tubing when the crimp ring 54 is applied. The intrusion of the inner periphery of the tubing further compresses the seal ring in the groove 62. This provides a better fluid tight seal. Because the external periphery of the seal ring 66 does not protrude above the external periphery 64, the intrusion of the inner periphery of the tubing also compresses the seal ring in the groove 62.

The crimp ring 54 is adapted to be compressed around an outer periphery of the end of the tubing 20 to retain the tubing connector 50 within the tubing 20 after the tubing connector 50 is inserted therein. The crimp ring 54 is a flat band with an inner diameter only slightly greater than an external diameter of the tubing 20 and is made of rigid deformable material, preferably a copper alloy. The crimp ring 54 is preferably wide enough to cover the two spaced apart seal rings 66 when it is registered over them. The crimp ring 54 is crimped with a hand tool which is well know in the art. The radial crimping force is indicated as arrow F in FIGS. 4 and 7. Radial pressure, indicated by the arrows f is maintained between the external periphery of the tubing 20 and the inner periphery of the compressed crimp ring 54 after the crimping force F is withdrawn. The pressure f exerts continual compression force on the end of tubing 20 and causes an inner periphery of the tubing to intrude into the annular grooves 62. This compresses the seal ring 66 in the groove 62, as illustrated in FIG. 7. The same compression force f, also forces the inner periphery of the tubing 20 into sealing contact with the external periphery of the connector end 58. Consequently, a dependable fluid tight seal between the inner periphery of tubing 20 and external periphery of the connector end 58 is assured.

FIG. 8 illustrates an installation procedure for the tubing connector assembly 50. To begin the installation, the crimp ring 54 is placed around the tubing 20 and moved away from the end of the tubing to which the tubing connector 56 is to be installed. The connector end 58 is inserted into the end of the tubing 20 as indicated by the arrow M1. No reaming or bevelling of the end of the tubing is required. After the connector end 58 is inserted in the end of tubing 20 and the end 76 of the tubing 20 abuts the shoulder 72 of the tubing connector, the crimp ring 54 is moved back to the end of the tubing 20, as indicated by arrow M2, and is registered over the two seal rings 66, as shown in FIG. 5. The crimp ring is then crimped with a hand tool to compress the end of the tubing 20. Consequently, installation is rapidly effected and a dependable fluid tight seal between the connector 50 and the tubing 20 is ensured.

We claim:

1. A tubing connector for sealingly engaging an end portion of a tubing adapted to serve as a conduit for pressurized fluids comprising:

a rigid tubular body having a fitting end, a cylindrical connector end that is tapered to facilitate insertion into the tubing and a bore that extends from the fitting end to the connector end, the connector end having at least one annular groove on an external periphery thereof and a elastic seal ring received in the annular groove, the annular groove having a depth slightly greater than a thickness of the seal ring and a width greater than a width of the seal ring; and an annular clamp adapted to be compressed around an outer periphery of an end of the tubing in a flat band to exert an even radial pressure and retain the tubing connector within the tubing after the tubing connector is inserted therein, whereby the seal ring is compressed inwardly by an inner periphery of the tubing and expands axially in the groove when the annular clamp is compressed.

2. A tubing connector as claimed in claim 1 wherein the connector end has a second annular groove and a second elastic seal ring received therein, the second groove being spaced from the at least one annular groove.

3. A tubing connector as claimed in claim 1 wherein the external periphery of the connector end has a diameter less than an inner diameter of the end of the tubing.

4. A tubing connector as claimed in claim 1 wherein the fitting end forms a shoulder adapted to limit the insertion of the connector end into the end of the tubing.

5. A tubing connector as claimed in claim 4 wherein the shoulder has an external diameter that is greater than the external diameter of the end of the tubing to prevent the crimp ring from sliding off of the end of the tubing before it is crimped.

6. A tubing connector as claimed in claim 1 wherein the crimp ring is made of a copper alloy.

7. A tubing connector for sealingly engaging an end of a composite tubing having a plastic inner periphery, adapted to serve as a conduit for pressurized fluid, comprising:

a rigid tubular body with a cylindrical connector end having an external diameter less than an inner diameter of the end of the tubing for insertion into the tubing, the cylindrical connector end including a taper to facilitate insertion of the tubing and at least one annular groove in an external periphery thereof and an elastic seal ring received in the annular groove, the annular groove having a depth slightly greater than a thickness of the seal ring and having a width greater than a width of the seal ring, the rigid tubular body further having a fitting end including a shoulder spaced from the cylindrical connector end and extending radially to limit insertion of the tubing connector in the tubing, and a fluid passage extending from the connector end to the fitting end; and a deformable crimp ring having a inner diameter slightly greater than an external periphery of the end of the tubing, the crimp ring being placed on the tubing before the cylindrical connector end is inserted therein and subsequently crimped to form a compressed flat band to exert an even radial pressure on an area of the tubing that overlies the cylindrical connector end to inhibit release of the tubing connector from the end of the tubing, whereby the seal ring is compressed inwardly by an inner periphery of the tubing and expands axially in the groove when the connector end is inserted into the tubing.

8. A tubing connector as claimed in claim 7 wherein the crimp ring is made of a copper alloy.

9. A tubing connector as claimed in claim 7 wherein the cylindrical connector end includes a second annular groove spaced from the at least one annular groove and a second elastic seal ring is received in the second annular groove.

10. A tubing connector as claimed in claim 9 wherein when the crimp ring is crimped, an annular part of the inner periphery of the tubing under the radial pressure exerted by the crimp ring intrudes into each of the annular grooves and compresses a corresponding one of the seal rings inwardly in the respective annular grooves to form a seal.

11. A tubing connector as claimed in claim 7 wherein the composite tubing comprises an inner layer of plastic material, an intermediate layer of aluminium and an outer layer of plastic material.

12. A method of sealing an interface between a cylindrical metal tubing connector and a tubing having a plastic inner periphery comprising:

inserting the tubing through a rigid flat deformable crimp ring and moving the flat deformable crimp ring away from the end of the tubing;

providing the tubing connector with an annular groove and the elastic seal ring in an annular groove around an external periphery of the metal tubing connector, the groove having a width greater than a width of the seal ring and a depth slightly greater than a thickness of the seal ring; and inserting the cylindrical metal tubing connector into an end of the tubing, moving the flat deformable crimp ring back to the end of the tubing and exerting an even radial pressure around the crimp ring to compress the crimp ring and the tubing so that an annular part of the inner periphery of the tubing intrudes into the annular groove and compresses the seal ring inwardly into the annular groove to form a seal.

13. A method as claimed in claim 12 wherein the tubing is a composite tubing comprising an inner layer of plastic material, an intermediate layer of an aluminium alloy and an outer layer of a plastic material.

* * * * *